United States Patent Office 3,205,250
Patented Sept. 7, 1965

3,205,250
3,9 - ALKOXY AND 3,9 - CHLOROPROPYL-
2,4,8,10 - TETRAOXA-3,9-PHOSPHOSPIRO
(6,6) HENDECANES
Ingenuin Hechenbleikner, Cincinnati, Ohio, assignor to
Hooker Chemical Corporation, Niagara Falls, N.Y., a
corporation of New York
No Drawing. Filed Nov. 20, 1961, Ser. No. 153,700
4 Claims. (Cl. 260—461)

This invention relates to the preparation of esters of phosphorous acid. In another aspect, it relates to the stabilization of polymers with such esters.

It is an object of the present invention to develop an improved process for preparing tertiary phosphites of high-boiling alcohols.

Another object is to prepare such phosphites having improved physical properties and particularly having improved purity.

Another object is to prepare novel phosphites that have the 3,9-alkoxy-2,4,8,10-tetraoxa-3,9-phospho spiro (6,6) hendecane structure:

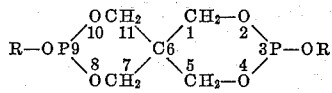

Another object is to prepare novel phosphites that have the 3,9-alkoxy-2,4,8,10-tetraoxa-3,9-phosphospiro (6,6) hendecane structure that are useful as stabilizers in vinyl and vinylidene polymers and copolymers.

Still further objects and the entire scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by the transesterification of tricresyl phosphite, triphenyl phosphite, mixed cresyl phenyl phosphites, tris (β - chloroisopropyl) phosphite, di (β - chloroisopropyl) phenyl phosphite, (β-chloroisopropyl) diphenyl phosphite, di (β-chloroisopropyl) cresyl phosphite, (β-chloroisopropyl) dicresyl phosphite, (β-chloroisopropyl) phenyl cresyl phosphite, tris (α-chloro methyl propyl) phosphite, tris 2-chloropropyl phosphite, tris 2-chlorobutyl phosphite, 2-phenoxy-1,3,2-dioxaphosphorinanes, 2-(β-chloroisopropoxy) - 1,3,2 - dioxaphosphorinanes, 2 - (2 - chloropropoxy) - 1,3,2 - dioxaphosphorinanes, 2 - phenoxy-1,3,2 - dioxaphospholanes, 2 - (2 - chloropropoxy)-1,3,2 - dioxaphospholanes, 2 - (β - chloroisopropoxy)-1,3,2 - dioxaphospholanes, 2 - (2 - chlorobutoxy) - 1,3,2-dioxaphospholanes, 2-(α-chloro methyl propoxy)-1,3,2-dioxaphospholanes. Preferably triphenyl phosphite, tricresyl phosphite, mixed cresyl phenyl phosphites, tris (β-chloroisopropyl) phosphite and mixed phenyl (β-chloroisopropyl) phosphites are employed as the phosphorous-containing raw materials.

As the higher boiling monohydric alcohol, there are employed alcohols having higher boiling points than propylene chlorhydrin. Among such alcohols are alkanols and cycloalkanols, such as n-hexanol, n-heptanol, n-octanol, 2-ethyl hexanol, isooctyl alcohol, octanol-2,2-methyl heptanol-2, n-decyl alcohol, isodecyl alcohol, lauryl alcohol, myristyl alcohol, cetyl alcohol, stearyl alcohol, cyclohexanol, methyl cyclohexanol, alkanediols or glycols such as ethylene glycol, propylene glycol, trimethylene glycol, 1,2-butylene glycol, 2,3-butylene glycol, 1,4-butylene glycol, 1,6-hexanediol, pinacol, 1,2-pentanediol, 2-methyl-2,4-pentanediol, 1,3-butylene glycol, neopentyl glycol, 2-ethyl-1,3-hexanediol, 2,4-pentanediol, 2,4-heptanediol, 2,2-diethyl-1,3-propanediol, 2-ethyl-2-n-butyl-1,3-propanediol, and also pentaerythritol.

The present invention is particularly valuable in preparing the tris alkyl phosphites from alkanols having six to twelve carbon atoms.

When employing the tris (β-chloroisopropyl) phosphite as a source of phosphorus raw material, the transesterification can be carried out at any temperature from room temperature to the boiling point of propylene chlorhydrin, at the pressure employed. Thus, at atmospheric pressure, the reaction can be carried out at temperatures up to one hundred and thirty-three degrees centigrade. The reaction can be carried out at atmospheric or subatmospheric pressure. Preferably, the pressure is subatmospheric, e.g., fifty millimeters or less. The propylene chlorhydrin formed is distilled off, and the desired phosphite is recovered as the residue from such distillation.

It is also possible to carry out the reaction at atmospheric pressure, and, then, separate the desired phosphite ester from the propylene chlorhydrin formed by distillation at reduced pressure, e.g., twenty-five millimeters or less.

When end products having alkyl end groups are prepared, it is preferred that the reaction temperature not exceed one hundred and forty degrees centigrade. When end products having aryl end groups are prepared, the reaction temperature should not exceed about one hundred and eighty degrees centigrade.

In some instances, one of the advantages of using tris (β-chloroisopropyl) phosphite lies in the fact that no catalyst need be employed, and, hence, there is no need to remove the catalyst from the final product. In addition, the propylene chlorhydrin by-product formed in the transesterification can be recovered under milder conditions of temperature than some substituted phenols can under reduced pressure.

Starting with basic raw materials, the overall reaction is as follows:

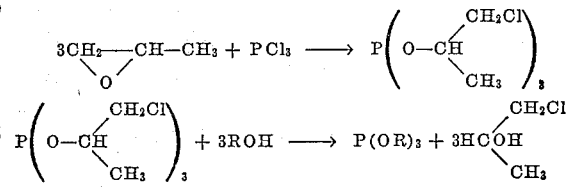

wherein R is an alkyl group.

The propylene chlorhydrin obtained as the by-product can be regenerated to propylene oxide by contact with a suitable strong base such as sodium hydroxide and calcium hydroxide.

In instances where triaryl phosphites are used as transesterifying agents, e.g., triphenyl phosphite, an alkaline catalyst is employed to increase the rate of reaction. However, the phenol can be recovered from the reaction mixture readily for reuse without the need of an additional chemical step.

In cases where dihydric alcohols or polyhydric alcohols are used, catalysts such as sodium methylate, sodium phenate, sodium hydride, sodium methoxide and other sodium alkoxides, and the corresponding potassium compounds can be used if desired with any of the phosphite starting materials.

In order to insure complete ester interchange using a monohydric alcohol, there should be employed at least three moles of alcohol per mole of triaryl phosphite or tris (β-chloroisopropyl) phosphite. Generally, from one percent to fifteen percent molar excess of the alcohol is employed to insure formation of the trialkyl ester. No advantage has been found in using over fifteen percent excess alcohol and, in general, ten percent to fifteen percent excess of the alcohol gives the best commercial quality product. The use of larger amounts of the alcohol means that more alcohol must be recovered in the subsequent distillation.

If less than three moles of the monohydric alcohol are employed, then mixed phosphites are obtained. Thus, when two moles of the monohydric alcohol are employed per mole of tris (β-chloroisopropyl) phosphite, there are obtained compounds such as diceryl (β-chloroisopropyl) phosphite, distearyl (β-chloroisopropyl) phosphite, dimethyl (β-chloroisopropyl) phosphite. Where one mole of monohydric alcohol is employed per mole of tris (β-chloroisopropyl) phosphite, there are obtained compounds such as hexyl di(β-chloroisopropyl) phosphite, stearyl di(β-chloroisopropyl) phosphite, methyl di(β-chloroisopropyl) phosphite and decyl di(β-chloroisopropyl) phosphite.

When two moles of the monohydric alcohol are employed per mole of triphenyl phosphite, there are obtained compounds such as didecyl phenyl phosphite, dioctadecyl phenyl phosphite, dimethyl phenyl phosphite. Where one mole of monohydric alcohol is employed per mole of triphenyl phosphite, such compounds as hexyl diphenyl phosphite, octadecyl diphenyl phosphite, decyl diphenyl phosphite, nonyl diphenyl phosphite, dodecyl diphenyl phosphite and monotridecyl diphenyl phosphite are obtained.

When using α, β, or α, γ glycols, if one equivalent (or more) of polyhydric alcohol is used per equivalent of tris (β-chloroisopropyl) phosphite, or triphenyl phosphite (e.g., three moles of ethylene glycol with two moles of tris [β-chloroisopropyl] phosphite), there are formed products of the following type:

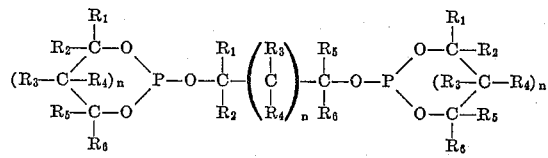

where $R_1$, $R_2$, $R_3$, $R_4$, $R_5$, and $R_6$ are hydrogen or lower alkyl groups and $n$ is 0 or 1. Examples of such compounds are bis (4,4,6-trimethyl-1,3,2-dioxaphosphorinanoxy)-1,1,3-propane, bis (1,3-2-dioxaphospholanoxy) ethane; bis (4-methyl-1,3,2-dioxaphospholanoxy)-1-methylethane; bis (4,5-dimethyl-1,3,2-dioxaphospholanoxy)-1-ethylethane; bis (4,4,5,5-tetramethyl-1,3,2-dioxaphospholanoxy) - 1,1,2,2 - tetramethylethane; bis (4-propyl-1,3,2-dioxaphospholanoxy) - 1 - propylethane; bis (1,3,2-dioxaphosphorinanoxy) propane; bis (4-methyl-1,3,2-dioxaphosphorinanoxy) - 1 - methylpropane; bis (5,5-dimethyl-1,3,2-dioxaphosphorinanoxy)-2,2-dimethylpropane; bis (4-propyl-5-ethyl-1,3,2-dioxaphosphorinanoxy) - 1 - propyl-2-ethylpropane; bis (4-propyl - 6 - methyl - 1,3,2-dioxaphosphorinanoxy)-1-propyl-3-methylpropane; bis (5,5-diethyl-1,3,2-dioxaphosphorinanoxy)-2,2-diethyl propane; bis (5-ethyl-5-butyl-1,3,2-dioxaphosphorinanoxy) - 2 - ethyl - 2-butylpropane; and bis (4-propyl-1,3,2-dioxaphosphorinanoxy)-1-propylpropane.

If less than one equivalent of a diol is employed, then monomeric products are formed which still have a 2-chlorpropyl, β-chloroisopropyl, cresyl or phenyl group remaining from the phosphite starting material. Thus, when reacting one mole of tris 2-chlorpropyl phosphite with one mole (or less) of a diol having two to three carbon atoms separating the hydroxyl groups there are formed products of the formula:

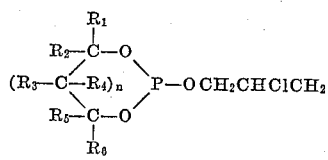

where $R_1$, $R_2$, $R_3$, $R_4$, $R_5$, and $R_6$ are hydrogen or lower alkyl groups and $n$ is either 0 or 1. Examples of compounds having this formula are 2-(2-chloro)propoxy-1-4,4,6-trimethyl-1-,3,2-dioxaphosphorinane;
2-(2-chloro)propoxy-1,3,2-dioxaphospholane;
2-(2-chloro)propoxy-4-methyl-1,3,2-dioxaphospholane;
2-(2-chloro)propoxy-4,5-dimethyl-1,3,2-dioxophospholane;
2-(2-chloro)propoxy-4-ethyl-1,3,2-dioxaphospholane;
2-(2-chloro)propoxy-4,4,5,5-tetramethyl-1,3,2-dioxaphospholane;
2-(2-chloro)propoxy-4-propyl-1,3,2-dioxaphospholane;
2-(2-chloro)propoxy-1,3,2-dioxaphosphorinane;
2-(2-chloro)propoxy-4-methyl-1,3,2-dioxaphosphorinane;
2-(2-chloro)-propoxy-5,5-dimethyl-1,3,2-dioxaphosphorinane;
2-(2-chloro)propoxy-4-propyl-5-ethyl-1,3,2-dioxaphosphorinane;
2-(2-chloro)propoxy-4-propyl-6-methyl-1,3,2-dioxaphosphorinane;
2-(2-chloro)propoxy-5,5-diethyl-1,3,2-dioxaphosphorinane;
2-(2-chloro)propoxy-5-ethyl-5-butyl-1,3,2-dioxaphosphorinane;
2-(2-chloro)propoxy-5-ethyl-5-butyl-1,3,2-dioxaphosphorinane;
2-(2-chloro)propoxy-4-propyl-1,3,2-dioxaphosphorinane.

When reacting one mole of tris (β-chloroisopropyl) phosphite with one mole (or less) of a diol having two to three carbon atoms separating the hydroxyl groups, there are formed:

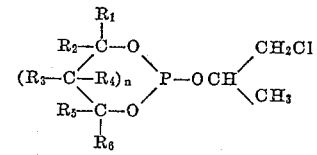

where $R_1$, $R_2$, $R_3$, $R_4$ $R_5$, and $R_6$ are hydrogen or lower alkyl and $n$ is either 0 or 1. Examples of compounds coming within this formula are 2-(β-chloroisopropoxy)-1,4,4,6-trimethyl-1,3,2-dioxaphosphorinane;
2-(β-chloroisopropoxy)-1,3,2-dioxaphospholane;
2-(β-chloroisopropoxy)-4-methyl-1,3,2-dioxaphospholane;
2-(β-chloroisopropoxy)-4,5-dimethyl-1,3,2-dioxaphospholane;
2-(β-chloroisopropoxy)-4-ethyl-1,3,2-dioxaphospholane;
2-β-chloroisopropoxy-4-propyl-1.3,2-dioxaphospholane;
2-(β-chloroisopropoxy)-1,3,2-dioxaphosphorinane;
2-(β-chlorisopropoxy)4-methyl-1,3,2-dioxaphosphorinane;
2-(β-chloroisopropoxy)-5,5-dimethyl-1,3,2-dioxaphosphorinane;
2-(β-chloroisopropoxy)-4-propyl-5-ethyl-1,3,2-dioxaphosphorinane;
2-(β-chloroisopropoxy)-4-propyl-6-methyl-1,3,2-dioxaphosphorinane;
2-(β-chloroisopropoxy)-5,5-diethyl-1,3,2-dioxaphosphorinane;
2-(β-chloroisopropoxy)-5-ethyl-5-butyl-1,3,2-dioxaphosphorinane;
2-(β-chloroisopropoxy)-5-ethyl-5-butyl-1,3,2-dioxaphosphorinane;
2-(β-chloroisopropoxy)-4-propyl-1,3,2-dioxaphosphorinane.

Thus, when reacting one mole of a triaryl phosphite with one mole (or less) of a diol having two to three carbon atoms separating the hydroxyl groups, there are formed products of the formula:

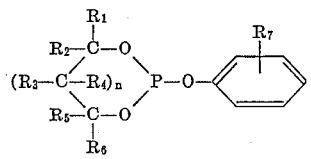

where $R_1$, $R_2$, $R_3$, $R_4$ $R_5$, and $R_6$ are hydrogen or lower alkyl; $R_7$ is hydrogen, lower alkyl, halo, nitro lower alkoxy, cyclohexyl, phenoxy, naphthoxy and phenyl; and $n$ is either 0 or 1. Examples of compounds coming within this formula are 2-phenoxy-1,3,2-dioxaphosphorinane;
2-phenoxy-4-methyl-1,3,2-dioxaphosphorinane;
2-phenoxy-5,5-dimethyl-1,3,2-dioxaphosphorinane;
2-phenoxy-4,4,6-trimethyl-1,3,2-dioxaphosphorinane;
2-phenoxy-4-propyl-5-ethyl-1,3,2-dioxaphosphorinane,
2-phenoxy-4,6-dimethyl-1,3,2-dioxaphosphorinane;
2-phenoxy-4-ethyl-5-methyl-1,3,2-dioxaphosphorinane;
4-propyl-6-methyl-1,3,2-dioxaphosphorinane;
2-phenoxy-5,5-diethyl-1,3,2-dioxaphosphorinane;
2-phenoxy-5-diethyl-1,3,2-dioxaphosphorinane;
2-phenoxy-5-ethyl-5-butyl-1,3,2-dioxaphosphorinane;
2-phenoxy-4-propyl-1,3,2-dioxaphosphorinane;
2-(2-chloro)-phenoxy-4,4,6-trimethyl-1,3,2-dioxaphosphorinane;
2-(3-chloro)-phenoxy-5,5-dimethyl-1,3,2-dioxaphosphorinane;
2-(4-chloro)-phenoxy-4-methyl-1,3,2-dioxaphosphorinane;
2-(2,3-dichloro)-phenoxy-4-methyl-1,3,2-dioxaphosphorinane;
2-(2,4-dichloro)-phenoxy-4-methyl-1,3,2-dioxaphosphorinane;
2-(2,5-dichloro)-phenoxy-4-methyl-1,3,2-dioxaphosphorinane;
2-(2,6-dichloro)phenoxy-4,4,6-trimethyl-1,3,2-dioxaphosphorinane;
2-(3,4-dichloro)phenoxy-4,4,6-trimethyl-1,3,2-dioxaphosphorinane;
2-(3,5-dichloro)phenoxy-4,4,6-trimethyl-1,3,2-dioxaphosphorinane;
2-(2-bromo)phenoxy-4,4,6-trimethyl-1,3,2-dioxaphosphorinane;
2-(3-bromo)phenoxy-4-methyl-1,3,2-dioxaphosphorinane;
2-(4-bromo)phenoxy-4-methyl-1,3,2-dioxaphosphorinane;
2-(4-iodo)phenoxy-4-methyl-1,3,2-dioxaphosphorinane;
2-(2-fluoro)phenoxy-4,4,6-trimethyl-1,3,2-dioxaphosphorinane;
2-(2-chloro-4-bromo)phenoxy-4,4,6-trimethyl-1,3,2-dioxaphosphorinane;
2-(2-methyl)phenoxy-4,4,6-trimethyl-1,3,2-dioxaphosphorinane;
2-(3-methyl)phenoxy-4-methyl-1,3,2-dioxaphosphorinane;
2-(4-methyl)phenoxy-4,4,6-trimethyl-1,3,2-dioxaphosphorinane;
2-(3,5-dimethyl)phenoxy-4,4,6-trimethyl-1,3,2-dioxaphosphorinane;
2-(2-ethyl)phenoxy-4-methyl-1,3,2-dioxaphosphorinane;
2-(4-ethyl)phenoxy-4-methyl-1,3,2-dioxaphosphorinane;
2-(2-hexyl)phenoxy-4,4,6-trimethyl-1,3,2-dioxaphosphorinane;
2-(2-cyclohexyl)phenoxy-4-methyl-1,3,2-dioxaphosphorinane;
2-(4-octyl)phenoxy-4,4,6-trimethyl-1,3,2-dioxaphosphorinane;
2-(3-isobutyl)-phenoxy-4-methyl-1,3,2-dioxaphosphorinane;
2-(4-dodecyl)phenoxy-4-methyl-1,3,2-dioxaphosphorinane;
2-(2-amyl)phenoxy-4-methyl-1,3,2-dioxaphosphorinane;
2-(4-butyl)phenoxy-4-methyl-1,3,2-dioxaphosphorinane;
2-(2-tertiary-butyl)phenoxy-4-methyl-1,3,2-dioxaphosphorinane;
2-(2-secondary-butyl)phenoxy-4-methyl-1,3,2-dioxaphosphorinane;
2-(2-nitro)phenoxy-4-methyl-1,3,2-dioxaphosphorinane;
2-(3-nitro)phenoxy-4,4,6-trimethyl-1,3,2-dioxaphosphorinane;
2-(4-nitro)phenoxy-4,4,6-trimethyl-1,3,2-dioxaphosphorinane.

These compounds can be used as starting materials in the instant invention where it is desired to replace the phenyl group with an alkyl group.

The compounds containing 2-chloropropoxy group, or a β-isopropyl group, and a five or six member heterocyclic ring are new compounds as are the compounds having two heterocyclic rings joined through an oxyalkyleneoxy bridge, and having as additional substituents attached to phosphorus an alkyoxy or a halo alkoxy group. They are useful as stabilizers and plasticizers for vinyl chloride resins and other polymeric materials. The other tertiary phosphites disclosed likewise are useful as plasticizers, deoxygenating agents, free radical scavengers and stabilizers for vinyl chloride resins. These compounds the also useful as chemical intermediates for they can be readily oxidized to phosphates or reacted with sulfur to form thiophosphates.

When two moles of triphenyl phosphite are reacted with one mole of pentaerythritol, there is formed a spiro compound bis-phenyl pentaerythritol diphosphite having the formula:

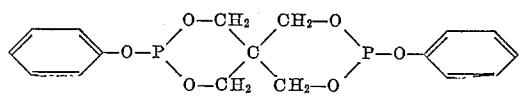

This compound can be used as a starting material in the instant invention where it is desired to replace the phenyl groups with an alkyl groups.

When two moles of tris 2-chloropropyl phosphite are reacted with one mole of pentaerythritol, there is formed the corresponding 2-chloropropyl spiro compound bis 2-chloropropyl pentaerythritol diphosphite, having the general formula:

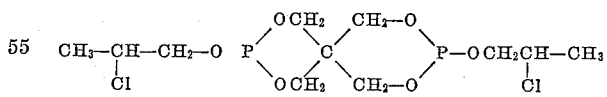

When two moles of tris (β-chloroisopropyl) phosphite are reacted with one mole of pentaerythritol, there is formed the corresponding (3,9-di (β-chloroisopropoxy)-2,4,8,10-tetraoxa-3,9-phosphospiro (6,6) hendecane (di [β-chloroisopropyl] pentaerythritol diphosphite), having the following formula:

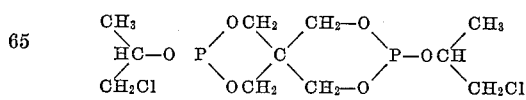

In cases where 2-phenoxy-1,3,2-dioxaphosphorinane having from one to three lower alkyl groups attached to the carbon atoms of the dioxaphosphorinane; 2-(2-chloropropoxy)-1,3,2-dioxaphosphorinane having from one to three lower alkyl groups attached to the carbon atoms of the dioxaphosphorinane ring; 2-(β-chloroisopropoxy)-1,3,2-dioxaphosphorinane having from one to three lower alkyl groups attached to the carbon atoms of the dioxaphosporinane ring; and 2-cresyloxy-1,3,2-dioxaphosphorinane having from one to three lower alkyl groups attached to the carbon atoms of the dioxaphosphorinane ring are used as the transesterification agent with one mole of a monohydric alcohol, there are formed products of the formula:

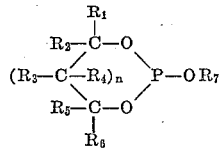

where $R_1$, $R_2$, $R_3$, $R_4$, $R_5$ and $R_6$ are hydrogen or lower alkyl, $R_7$ is alicyclic containing from six to twenty carbon atoms or alkyl containing from six to twenty carbon atoms, and $n$ is either 0 or 1. Examples of compounds having this formula are 2-n hexyloxy-4,4,6-trimethyl-1,3,2-dioxaphosphorinane; 2-octyloxy-5,5-dimethyl-1,3,2-dioxaphosphorinane; 2-decyloxy-5,5-dimethyl-1,3,2-dioxaphosphorinane; 2-octadecyloxy-4-methyl-1,3,2-dioxaphosphorinane; 2-(2-ethylhexyl)oxy-5,5-dimethyl-1,3,2-dioxaphosphorinane; 2-tridecyloxy-4-methyl-1,3,2-dioxaphosphorinane.

When the compound having the formula:

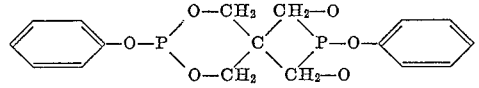

is reacted with two moles of monohydric alcohol such as decyl alcohol, stearyl alcohol and lauryl alcohol, there are formed products having the formula:

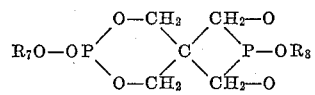

wherein $R_7$ and $R_8$ are alicyclic groups containing from six to eighteen carbon atoms or alkyl containing six to eighteen carbon atoms. Examples of such compounds are didecyl pentaerythritol diphosphite, distearyl pentaerythritol diphosphite, and dilauryl pentaerythritol diphosphite.

*Example 1*

| | Grams |
|---|---|
| 2-methyl-2,4-pentanediol (hexylene glycol) (one mole) | 118 |
| Triphenyl phosphite (1.2 moles) | 372 |
| Metallic sodium (0.17 mole) | 4 |

The sodium was added to the hexylene glycol and heated to ninety-five degrees centigrade to dissolve the sodium. The mixture was cooled to room temperature and then the triphenyl phosphite was added. A slight exothermic reaction was noted. The mixture was heated to one hundred and thirty degrees centigrade at atmospheric pressure. The pH was maintained between nine and ten and the phenol was distilled off under water pump vacuum. After all of the phenol was collected, the water vacuum pump was replaced by a high vacuum pump and the distillation continued until a pot temperature of one hundred and thirty degrees centigrade at about one millimeter was reached. The reaction was not allowed to go above one hundred and thirty degrees centigrade at any time during the reaction.

2-phenoxy-4,4,6-trimethyl-1,3,2-dioxaphosphorinane having the formula

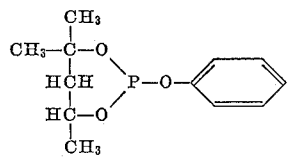

was obtained in a yield of eighty percent based on the amount of starting glycol. This compound is a liquid having a boiling point of ninety-five degrees centigrade at one millimeter Hg, $N_D^{25}$ 1.51245 and $d_{15}^{25}$ 1.0934.

*Example 2*

Example 1 was repeated using just one mole of triphenyl phosphite per mole of glycol. The 2-phenoxy-4,4,6-trimethyl-1,3,2-dioxaphosphorinane was obtained in good yield.

*Example 3*

| | | |
|---|---|---|
| 1,3-butane diol (1,3-butylene glycol) | moles | 1 |
| Triphenyl phosphite | do | 1 |
| Sodium | grams | 1 |

The triphenyl phosphite and glycol were mixed in a flask and the sodium added. The mixture was heated gradually upon an oil bath at ten to fifteen millimeters pressure and the phenol distilled through a small column. After the phenol was removed, the product distilled as a colorless liquid at one hundred and twenty-five to one hundred and thirty degrees centigrade at eight millimeters. The yield of 2-phenoxy-4-methyl-1,3,2-dioxaphosphorinane of the formula:

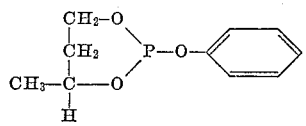

obtained was seventy-one percent of theoretical based on the glycol used. The product obtained had a $N_D^{25}$ 1.515130 and $d_{15}^{25}$ 1.178.

*Example 4*

| | Moles |
|---|---|
| 2,2-dimethyl-1,3-propane diol (neopentyl glycol) | 1 |
| Triphenyl phosphite | 1 |

The reagents were mixed and the phenol was stripped as in Example 3. Then the product was recovered by distillation at ninety to ninety-five degrees centigrade at one millimeter in a yield of six ounces (about thirty percent based on the glycol used). The product was 2-phenoxy-5,5-dimethyl-1,3,2-dioxaphosphorinane having the formula:

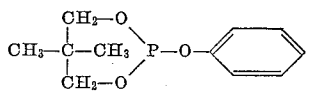

and having a $N_D^{25}$ of 1.50375.

*Example 5*

Example 4 was repeated but adding one gram of sodium in the same manner as Example 3. The yield of the desired cyclic phosphite was much improved over those obtained in Example 4.

*Example 6*

| | Moles |
|---|---|
| Phenyl ethylene phosphite | 40 |
| Decanol | 40 |

A mixture of the phenyl ethylene phosphite and one-third of the amount of decanol was heated to one hundred Tfter about one liter of phenol had been collected the remaining decanol was added slowly as the phenol distilled. Thus, another 2,050 milliliters of phenol was collected, followed by another 1150 milliliters of distillate. The distillate contained a considerable amount of phenol. Fractionation was continued until a sample of the pot residue showed essentially no phenyl absorption in the infrared spectra. At this point, the residue was cooled, was treated to remove residual acidity and was filtered. The filtrate was clear and colorless, and was about eighty-five percent of the theory of the following compound:

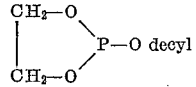

The refractive index was $N_D^{25}$ 1.4563.

Example 7

2-phenoxy-5,5-dimethyl-1,3,2-dioxaphosphorinane

| | | |
|---|---|---|
| | moles | 1 |
| n-Decyl alcohol | do | 1 |
| Sodium | grams | 1 |

The process of Example 6 was repeated, except that all of the reactants were mixed together initially, and there was recovered 2-n-decyloxy-5,5-dimethyl-1,3,2-dioxaphosphorinane.

Example 8

One mole of pentaerythritol, two moles of triphenyl phosphite and 0.05 mole of sodium phenate were allowed to stand together at room temperature and atmospheric pressure for half an hour, and then the mixture was heated to one hundred and twenty degrees centigrade at ten millimeters pressure until the phenol that formed was distilled. The yield of phenol was substantially quantitative for the removal of two phenyl groups from each mole of the triphenyl phosphite. The product obtained in quanitative yield was:

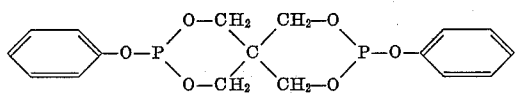

This compound was insoluble in water but soluble in hot hexane and other aliphatic hydrocarbons. It has a melting point of one hundred and twenty-three degrees centigrade.

Example 9

| | | |
|---|---|---|
| Compound of Example 8 | moles | 1 |
| Isodecanol | do | 2 |
| Sodium | grams | 0.5 |

The sodium was dissolved in the isodecanol and the compound of Example 8 was added. The mixture was distilled through a twelve inch column at twelve millimeters Hg pressure. Most of the phenol formed distilled at seventy degrees centigrade. The last traces of phenol and alcohol were removed by heating to one hundred and eighty degrees centigrade at one millimeter Hg pressure. The product was a clear, colorless viscous liquid, $N_D^{25}$ 1.4731, $d_{25}$ 1.0. The name diisodecyl pentaerythritol phosphite was assigned to the spiro product having this formula:

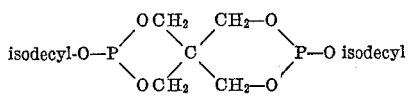

An examination of the infrared spectra of the product showed that essentially no phenyl groups were present.

Example 10

| | | |
|---|---|---|
| Compound of Example 8 | moles | 1 |
| Decyl alcohol | do | 2 |
| Sodium | grams | 1 |

The process of Example 9 was repeated and there was recovered didecyl pentaerythritol diphosphite having the following formula:

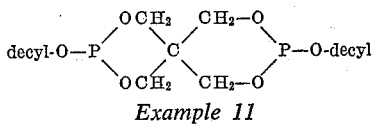

Example 11

| | | |
|---|---|---|
| Compound of Example 8 | moles | 0.263 |
| Stearyl alcohol | do | 0.526 |
| Sodium hydride | grams | 0.2 |

The process of Example 9 was repeated and there was recovered an almost theoretical yield of distearyl pentaerythritol diphosphite as a soft wax. The product had a density of $d^{25}$ .949 and a refractive index of $N_D^{60}$ 1.4582 and $N_D^{55}$ 1.4602.

Example 12

| | | |
|---|---|---|
| Compound of Example 8 | moles | 0.263 |
| Lauryl alcohol | do | 0.526 |
| Sodium hydride | grams | 0.2 |

The process of Example 9 was repeated and there was recovered in nearly theoretical yield the product dilauryl pentaerythritol diphosphite. The refractive index of the product was $N_D^{25}$ 1.4725, and the density was $D^{25}$ 1.015. The product as obtained was a white, semi-solid of melting point of about thirty-five degrees centigrade.

Example 13

| | | |
|---|---|---|
| Compound of Example 8 | moles | 0.263 |
| 2-ethylhexanol | do | 2.104 |
| Sodium hydride | grams | 0.2 |

The process of Example 9 was repeated and there was recovered in good yield the product di-2-ethylhexyl pentaerythritol diphosphite. $N_D^{25}$ 1.4688, $D^{25}$ 1.04.

Example 14

| | |
|---|---|
| | Moles |
| Tris(β-chloroisopropyl)phosphite | 0.55 |
| Pentaerythritol | 0.25 |

The reactant tris(β-chloroisopropyl)phosphite and pentaerythritol were mixed and heated to seventy degrees centigrade until solution of the pentaerythritol was complete. The reaction system was then subjected to a pressure of seventy millimeters of Hg and the 1-chloro-2-propanol was distilled from the reaction mixture at a body temperature of eighty to one hundred and twenty degrees centigrade. The product a nearly colorless liquid, was obtained in good yield and had a refractive index of $N_D^{25}$ 1.4372 and a density of $D^{35}$ 1.318. The product can be represented by the following structural formula:

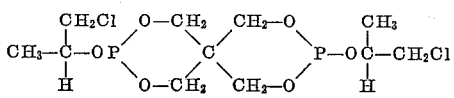

Example 15

Tris(β-chloroisopropyl)phosphite prepared by the reaction of propylene oxide with phosphorus trichloride was reacted with pentaerythritol in a mol ratio of two to one following the procedure of Example 14. In this instance the propylene chlorohydrin was collected in a yield of greater than ninety percent of theory and the properties of this material were as follows: boiling point, seven hundred and sixty millimeters was one hundred twenty-six degrees centigrade. Refractive index $N_D^{25}$ 1.4372, $d_{20}^{20}$ 1.116 and these compare favorably with reported properties of 1-chloro-2-propanol of boiling point, seven hundred and sixty-two millimeters was one hundred and twenty-seven degrees centigrade. Refractive index $N_D^{25}$ 1.4372, $d_{20}^{20}$ 1.115. In addition, the infrared spectra of the propylene chlorohydrin collected was identical to the infrared spectra of an authentic sample of 1-chloro-2-propanol.

Example 16

A mixture of 2-chloropropanol (three moles) and trimethyl phosphite (one mole) were subjected to conditions of ester interchange with the concomitant removal of methanol. The product formed was heated to a temperature of one hundred and ten degrees centigrade under forty-five millimeters of Hg pressure. There was obtained 2.2 mole of the desired product tris(2-chloropropyl)phosphite. This product was then reacted with 1.1 moles of pentaerythritol under the conditions of Example 14 and there was recovered in good yield a viscous slightly yellow liquid that had the formula:

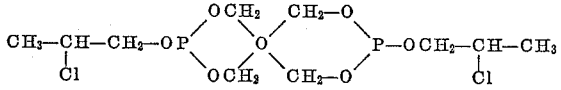

Example 17

| | Moles |
|---|---|
| Compound of Example 14 | 0.263 |
| n-Octanol-1 | 0.526 |

The process of Example 9 was repeated and there was recovered in high yield the dioctyl pentaerythritol diphosphate.

Example 18

| | Moles |
|---|---|
| Compound of Example 14 | 0.263 |
| Tridecyl alcohol | 0.526 |

The process of Example 9 was repeated and there was recovered in almost quantitative yield the di(tridecyl) pentaerythritol disphosphite.

Example 19

| | | |
|---|---|---|
| Triphenyl phosphite | moles | 2.0 |
| Ethylene glycol | do | 3.0 |
| Sodium | grams | 1.0 |

The process of Example 1 was repeated and triethylene glycol diphosphite (bis(1,3,2 - dioxaphospholanoxy) ethane) having the formula:

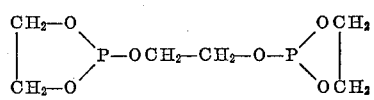

was recovered:

Example 20

| | Moles |
|---|---|
| Tris($\beta$-chloroisopropyl)phosphite | 2.0 |
| Propylene glycol-1,2 | 3.0 |

The process of Example 1 was repeated and tripropylene glycol diphosphite having the formula:

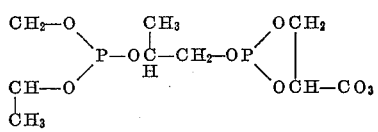

was recovered.

Example 21

| | Moles |
|---|---|
| Tris($\beta$-chloroisopropyl)phosphite | 2.0 |
| 2-methyl 2,4-pentanediol | 3.0 |

The process of Example 20 was repeated and there was recovered bis (4,4,6 - trimethyl - 1,3,2 - dioxaphosphorinanoxy)1,1,3-trimethyl propane.

Example 22

| | Moles |
|---|---|
| Tricresyl phosphite | 2.0 |
| 2-ethyl 2,4-pentanediol | 3.0 |

The process of Example 19 was repeated and there was recovered bis(4 - ethyl-4,6-dimethyl 1,3,2 - dioxaphosphorinanoxy 1-ethyl-1,3-dimethyl propane.

Example 23

| | Moles |
|---|---|
| Diphenyl $\beta$-chloroisopropyl phosphite | 2.0 |
| 1,3-propanediol | 3.0 |

The process of Example 20 was repeated and there was obtained bis(1,3,2-dioxaphosphorinanoxy)propane.

Example 24

| | Moles |
|---|---|
| Tris($\beta$-chloroisopropyl)phosphite | 0.5 |
| Ethylene glycol | 0.5 |

The process of Example 20 was repeated and there was recovered 2 - ($\beta$ - chloroisopropoxy) - 1,3,2 - dioxaphospholane.

Example 25

| | Moles |
|---|---|
| Tris($\beta$-chloroisopropyl)phosphite | 0.5 |
| Butanediol-1,3 | 0.5 |

The process of Example 20 was repeated and there was recovered 2 - ($\beta$-chloroisopropoxy)-4-methyl-1,3,2-dioxaphosphorinane.

Example 26

| | Moles |
|---|---|
| Tris($\beta$-chloroisopropyl)phosphite | 0.5 |
| 1,3-propanediol | 0.5 |

The process of Example 20 was repeated and there was recovered 2 - ($\beta$-chloroisopropoxy)-1,3,2-dioxaphosphorinane.

Example 27

| | Moles |
|---|---|
| Tris($\beta$-chloroisopropyl)phosphite | 0.5 |
| 2-methyl-1,2,4-pentanediol | 0.25 |

The process of Example 20 was repeated and there was recovered 2 - ($\beta$-chloroisopropyl)-4,4,6-trimethyl-1,3,2-dioxaphosphorinane.

Example 28

The product from Example 14 was evaluated as a heat stabilizer for polyvinyl chloride resins in the following manner. A formulation of polyvinyl chloride resin was prepared containing the following ingredients:

| | Grams |
|---|---|
| Polyvinyl chloride | 5.0 |
| Di-2-ethylhexyl phthalate | 22.5 |
| Barium-cadmium laurate | 1.0 |
| Product of Example 14 | 0.25 |

After mixing all of the ingredients, the formulation was milled on a rubber mill at three hundred degrees Fahrenheit for about five minutes to produce a polyvinyl chloride film of forty-five mils thickness.

The milled sheets were cut into three-quarter inch by one and one-quarter inch rectangles, mounted on a horizontal glass plate and placed in a three hundred and fifty degree Fahrenheit oven along with samples of the same formulation except that the product of Example 14 was absent. Individual samples were removed from the oven at fifteen minute intervals. It was observed that the control samples containing no phosphite spotted after forty-five minutes, while the samples containing the 3,9 - di($\beta$ - chloroisopropoxy) - 2,4,8,10 - textraoxa - 3,9-phosphospiro(6.6)-hendecane did not spot until after an exposure of one hundred and eighty-five minutes in the three hundred and fifty degree Fahrenheit oven. This experiment establishes the fact that the product of Example 14 is an effective stabilizer for vinyl chloride polymers.

Example 29

In order to demonstrate the improved stabilizing efficiency of the 3.9 - di($\beta$ - chloroisopropoxy) - 2,4,8,10-tetraoxa - 3,9 - phosphospiro(6.6)hendecane over other chlorine containing phosphites the following formulation was made using tris($\beta$-chloroisopropyl)phosphite:

| | Grams |
|---|---|
| Polyvinyl chloride | 50 |
| Di-2-ethylhexyl phthalate | 22.5 |
| Barium-cadmium laurate | 1.0 |
| Tris($\beta$-chloroisopropyl)phosphite | 0.25 |

After mixing and milling as in Example 28, it was found that the samples spotted after an exposure time of seventy-five minutes as compared to the one hundred and eighty-five minutes in Example 28.

Example 30

Formulations of polyvinyl chloride made following the procedure of Example 28, except that 3,9 - dilauryl-2,4,8,10-tetraoxa-3,9-phosphospiro(6,6)hendecane (dilauryl pentaerythritol diphosphite) is used as the phosphite, give vinyl chloride sheets that do not begin to spot until about two hundred minutes.

Example 31

Formulations of polyvinyl chloride made following the procedure of Example 28 except that 3,9-diotadecyloxy-2,4,8,10 - tetraoxa - 3,9 - phosphospiro (6.6) hendecane (distearyl pentaerylthritol diphosphite) is used as the phosphite, give vinyl chloride sheets that do not spot until exposure to a three hundred and fifty degree Fahrenheit oven for more than one hundred and fifty minutes.

Example 32

Formulations of a co-polymer of vinyl chloride and vinylidene chloride made according to the procedure of Example 31 give polymer sheets that do not spot until exposure to the three hundred and fifty degree Fahrenheit oven is in effect for more than one hundred and thirty-five minutes.

The foregoing examples demonstrate that the phosphorous compounds of this invention have been found to be useful as heat stabilizers for halogen containing vinyl and vinylidene resins in which the halogen is attached directly to the carbon atoms in the polymer chain. Preferably, the resin is a vinyl halide resin, specifically a vinyl chloride resin. Usually the vinyl chloride resin is made from monomers consisting of vinyl chloride alone or a mixture of monomers comprising at least seventy percent vinyl chloride by weight. The phosphite stabilizer is normally used in an amount of 0.05 to twenty parts per one hundred parts of the vinyl chloride resin and preferably in an amount between 0.5 and ten parts per one hundred parts of resin.

As the chlorinated resin there can be employed chlorinated polyethylene having about fourteen to about seventy-five percent, e.g., twenty-seven percent chlorine, by weight, polyvinyl chloride, polyvinylidene chloride, polyvinyl bromide, polyvinyl fluoride, copolymers of vinyl chloride with one to thirty percent by weight copolymerizable materials such as vinyl acetate, vinylidene chloride, diethyl fumarate, diethyl maleate and other alkyl fumarates and maleates, vinyl propionate, methyl acrylate, ethyl acrylate, butyl acrylate and other alkyl acrylates, methyl methacrylate, ethyl methacrylate, butyl methacrylate and other methacrylates, methyl-alpha-chloroacrylate, styrene trichloroethylene, etc. Typical copolymers include vinyl chloride-vinyl acetate (95:5 weight ratio), vinyl chloride-vinyl acetate (87:13 weight ratio), vinyl chloride-vinyl acetate-maleic anhydride (86:13:1 weight ratio), vinyl chloride-vinylidene chloride (95:5 weight ratio), vinyl chloride-diethyl fumarate (95:5 weight ratio), vinyl chloride-trichloroethylene (95:5 weight ratio).

The vinyl and vinylidene polymers employed and copolymers can be formed by any of the conventional processes. Suitable methods include aqueous emulsion polymerization, as well as organic solvent polymerization, etc.

The stabilizers of the present invention can be incorporated with the resins in conventional manner. Thus, they can be mixed together with or without a volatile solvent such as acetone and the resulting mixture milled on rolls at one hundred to one hundred and sixty degrees centigrade until it is completely homogenized. To prevent discoloration due to heat it is preferable to mix the resin and stabilizer thoroughly before heating. The stabilized resin is removed from the mill in the form of a sheet and can be used as such.

In addition to the novel stabilizer there can also be incorporated with the resin plasticizers, pigments, fillers and other conventional additives, either prior to or during the milling operation. If a plasticizer is employed, it is used in conventional amount, e.g., forty to one hundred and fifty parts per one hundred parts of resin. Typical plasticizers are di-2-ethylhexyl phthalate, dibutyl sebacate, dioctyl sebacate, tricresyl phosphate, etc.

The compounds of the present invention are not only effective heat stabilizers themselves for vinyl halide resins but they can be employed as additives with other vinyl halide resin stabilizers; e.g., the barium and cadmium soaps such as barium laurate, cadmium stearate, barium-cadmium palmitate, and the like. When the phosphites of the present invention are used with other heat stabilizers, generally five to ninety-five percent of the total stabilizer can be the novel phosphite.

Unless otherwise stated, all parts and proportions in the present specification and claims are parts by weight.

I claim:
1. Cyclic phosphites having the formula:

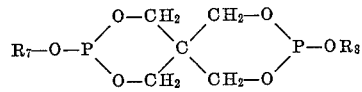

wherein $R_7$ and $R_8$ are selected from the group consisting of alkyl having six to eighteen carbon atoms in the alkyl group, $\beta$-chloroisopropyl and 2-chloropropyl.

2. A compound according to claim 1 wherein both $R_7$ and $R_8$ are decyl.

3. The compound according to claim 1 wherein $R_7$ and $R_8$ are $\beta$-chloroisopropyl.

4. A compound according to claim 1 wherein $R_7$ and $R_8$ are each alkyl of 6 to 18 carbon atoms.

References Cited by the Examiner

UNITED STATES PATENTS

| | | | |
|---|---|---|---|
| 2,659,716 | 11/53 | Park | 260—92.8 |
| 2,664,416 | 12/53 | Park | 260—92.8 |
| 2,847,443 | 8/58 | Hechenbleikner | 260—461 |
| 2,961,454 | 11/60 | Gould et al. | 260—461 |
| 2,974,158 | 3/61 | Lanham | 260—461 |
| 3,055,861 | 9/62 | Hersh et al. | 260—461 |

OTHER REFERENCES

Allen et al.: "J. Am. Chem. Soc., vol. 77, pp. 2871–2875 (1955).

Weston Chemical Corporation Product List MI 3 4377 (July 15, 1960), 4 pp.

CHARLES B. PARKER, *Primary Examiner.*

M. LIEBMAN, IRVING MARCUS, *Examiners.*